(12) United States Patent
Babin et al.

(10) Patent No.: US 7,547,208 B2
(45) Date of Patent: Jun. 16, 2009

(54) INDIVIDUAL CAVITY SHUT-OFF VALVE FOR AN INJECTION MOLDING APPARATUS

(75) Inventors: Denis Babin, Georgetown (CA); Valery Ten, Burlington (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 150 days.

(21) Appl. No.: 11/764,163

(22) Filed: Jun. 15, 2007

(65) Prior Publication Data

US 2008/0044513 A1  Feb. 21, 2008

Related U.S. Application Data

(60) Provisional application No. 60/814,388, filed on Jun. 16, 2006.

(51) Int. Cl.
*B29C 45/23* (2006.01)

(52) U.S. Cl. ............... 425/562; 425/564; 425/572

(58) Field of Classification Search .......... 425/562, 425/564, 565, 566, 572
See application file for complete search history.

(56) References Cited

U.S. PATENT DOCUMENTS

| | | | |
|---|---|---|---|
| 3,371,384 | A * | 3/1968 | Nouel .............. 425/564 |
| 6,146,123 | A | 11/2000 | Lausenhammer et al. |
| 6,245,279 | B1 | 6/2001 | Kalemba |
| 7,322,817 | B2 | 1/2008 | Manner |
| 2004/0009259 | A1 | 1/2004 | Manner |
| 2006/0233911 | A1 | 10/2006 | Spuller |
| 2006/0257521 | A1 | 11/2006 | Spuller |

FOREIGN PATENT DOCUMENTS

| | | |
|---|---|---|
| DE | 4234326 | 4/1994 |
| DE | 197 42 099 A1 | 4/1998 |
| DE | 20 2008 005 073 U1 | 8/2008 |
| EP | 0 447 573 A1 | 9/1991 |
| JP | 54-072262 | 6/1979 |
| JP | 54-076656 | 6/1979 |
| JP | 54-076657 | 6/1979 |
| JP | 7-068601 | 3/1995 |

* cited by examiner

*Primary Examiner*—Tim Heitbrink
(74) *Attorney, Agent, or Firm*—Medler Ferro PLLC

(57) ABSTRACT

An injection molding apparatus includes a first nozzle having a first nozzle melt channel in fluid communication with a manifold melt channel, and a second nozzle having a second nozzle melt channel in fluid communication with the first nozzle melt channel. A nozzle link is provided between the first nozzle and the second nozzle and includes a nozzle link melt passage for fluidly coupling the first nozzle melt channel and the second nozzle melt channel. The second nozzle includes a plurality of outwardly extending melt passages in fluid communication with the second nozzle melt channel. The outwardly extending melt passages deliver melt to a plurality of mold cavities through a plurality of respective gate seals and mold gates. A shut-off valve is disposed within a bore in the second nozzle. The bore intersects with one of the outwardly extending melt passages. The shut-off valve includes a passage therethrough such that when the passage is aligned with the outwardly extending melt passage, the melt stream may flow through the shut-off valve, and when the passage is aligned substantially perpendicular to the outwardly extending melt passage, the melt stream is prevented from flowing past the shut off-valve.

24 Claims, 8 Drawing Sheets

INDIVIDUAL CAVITY SHUT-OFF VALVE FOR AN INJECTION MOLDING APPARATUS

CROSS-REFERENCE TO RELATED APPLICATION

This application claims the benefit of U.S. provisional patent application No. 60/814,388 filed Jun. 16, 2006, which is hereby incorporated by reference in its entirety herein.

BACKGROUND OF THE INVENTION

1. Field of the Invention

The present invention relates generally to an injection molding apparatus and, in particular, to an individual shut-off valve for a multi-tip melt disk injection molding apparatus.

2. Related Art

Edge gating from a nozzle of an injection molding apparatus through a number of edge gate tips is well known. A multi-cavity edge, or side, gated injection molding apparatus is described in U.S. Pat. No. 5,494,433 to Gellert, issued Feb. 27, 1996, which is incorporated in its entirety herein by reference thereto. Generally, the multi-cavity edge-gated injection molding apparatus includes several nozzles that are coupled to a manifold to receive a melt stream of moldable material therefrom. Each nozzle is mounted in a cylindrical opening in a mold to convey pressurized melt through a nozzle melt channel to mold gates, which lead to mold cavities in the mold. The mold cavities are spaced radially around the nozzle. Each mold gate extends through a gate insert, which is held in position by a gate insert retainer plate. Each mold gate is aligned with a gate seal that is threadably coupled to the nozzle. As such, the location of the gate seals is generally fixed relative to the mold.

A multi-cavity edge gated injection molding apparatus with a first nozzle, a nozzle link, and a second nozzle is described in U.S. Published Application Publication No. 2005-0196486 A1, published Sep. 8, 2005, which is incorporated in its entirety herein by reference thereto.

In such multi-cavity applications, a plethora of cavities are used during production, for example, a mold may have 192 mold cavities. A mold cavity, cavity insert, nozzle tip, gate seal, or other portion of the apparatus relating to a particular mold cavity may become damaged or otherwise not function properly. In such a situation with a conventional multi-cavity injection molding apparatus, an operator must shut down the entire mold while disassembling, repairing, and reassembling the damaged or malfunctioning area. Stopping an entire production for a problem relating to one mold cavity is inefficient.

SUMMARY OF THE INVENTION

According to an embodiment of the present invention there is provided a mult-cavity injection molding apparatus including a first nozzle having a first nozzle melt channel in fluid communication with a manifold melt channel, and a second nozzle having a second nozzle melt channel in fluid communication with the first nozzle melt channel. A nozzle link is provided between the first nozzle and the second nozzle and includes a nozzle link melt passage for fluidly coupling the first nozzle melt channel and the second nozzle melt channel. The second nozzle includes a plurality of outwardly extending melt passages in fluid communication with the second nozzle melt channel. The outwardly extending melt passages deliver melt to a plurality of mold cavities through a plurality of respective nozzle tips and mold gates. A shut-off valve is disposed within a bore in the second nozzle. The bore intersects with one of the outwardy extending melt passages. The shut-off valve includes a passage therethrough such that when the passage is aligned with the outwardly extending melt passage, the melt stream may flow through the shut-off valve, and when the passage is aligned substantially perpendicular to the outwardly extending melt passage, the melt stream is prevented from flowing past the shut off-valve.

According to one embodiment of the present invention, the shut-off valve includes a plug and a cap. The plug includes the passage therethrough and the cap secures the plug within the bore in the second nozzle. The cap includes a threaded outer surface that engages a threaded inner surface of the bore. A front surface of the cap abuts against a shoulder of the plug to retain the plug within the bore in the second nozzle. In order to switch the shut-off valve from an open position to a closed position, the cap is loosened within the bore in the second nozzle, a tool such as an allen wrench is inserted through an access bore in the mold cavity plate and engages a shaped recess in a front surface of the plug. The plug is rotated from a position wherein the passage through the plug is aligned with the outwardly extending melt passage (open position) to a position wherein the passage through the plug is substantially perpendicular to the outwardly extending melt passage (closed position). The cap may include a nut-shaped head that can be rotated using a conventional socket or the cap may include recesses in a front surface thereof that can be engaged by a tool with projections corresponding to the recesses.

According to another embodiment of the present invention, the shut off valve includes a plug and a cap, wherein the cap is disposed adjacent to the plug in a second bore. The cap includes a head that overlaps with a portion of the plug to secure the plug in its bore. In order to switch shut-off valve, the cap is loosened and then the plug is rotated in the same fashion described above.

BRIEF DESCRIPTION OF THE FIGURES

Embodiments of the present invention will now be described more fully with reference to the accompanying drawings where like reference numbers indicate similar structure.

DETAILED DESCRIPTION OF THE INVENTION

Figure 1:
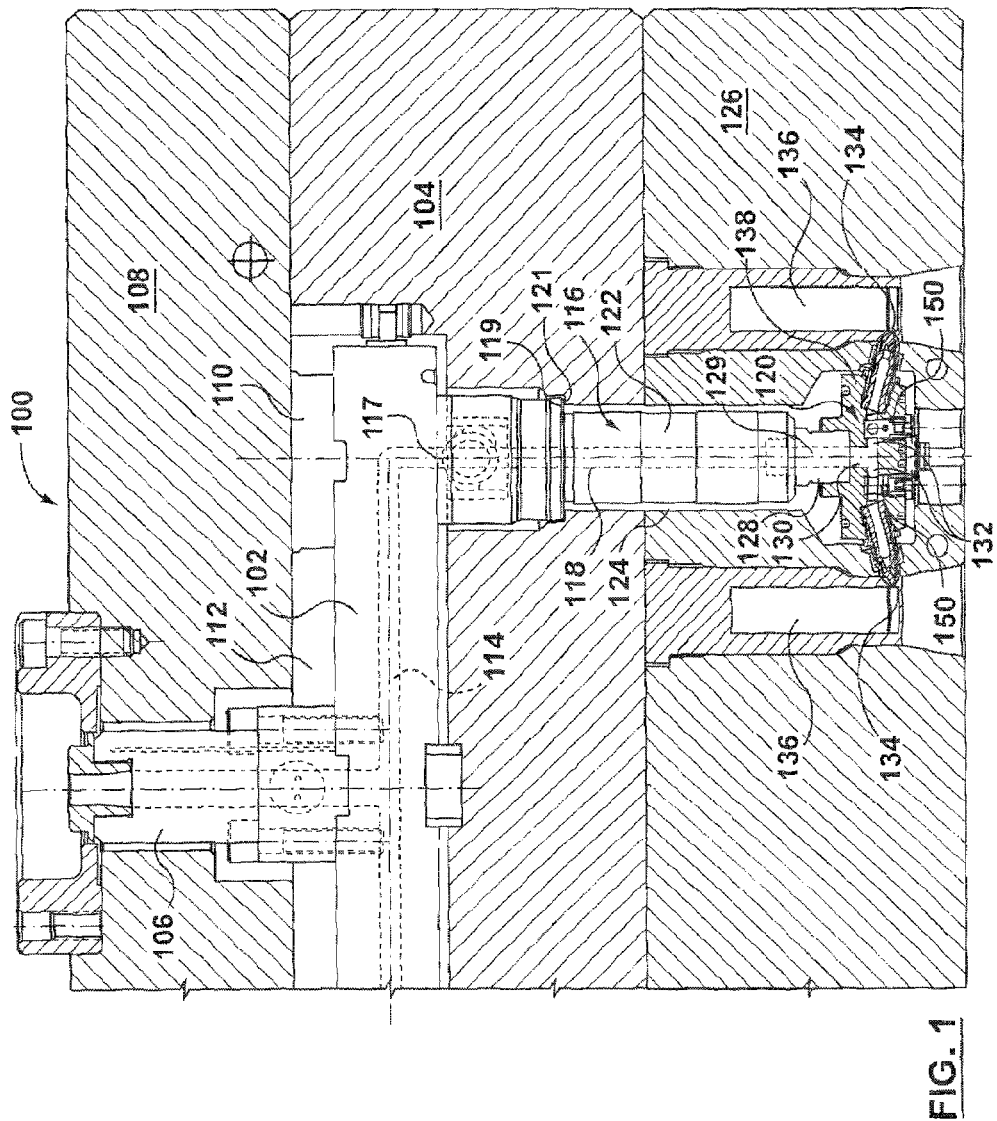
FIG. 1 is a partial cross-sectional view of a portion of an injection molding apparatus according to an embodiment of the present invention.
Figure 2:
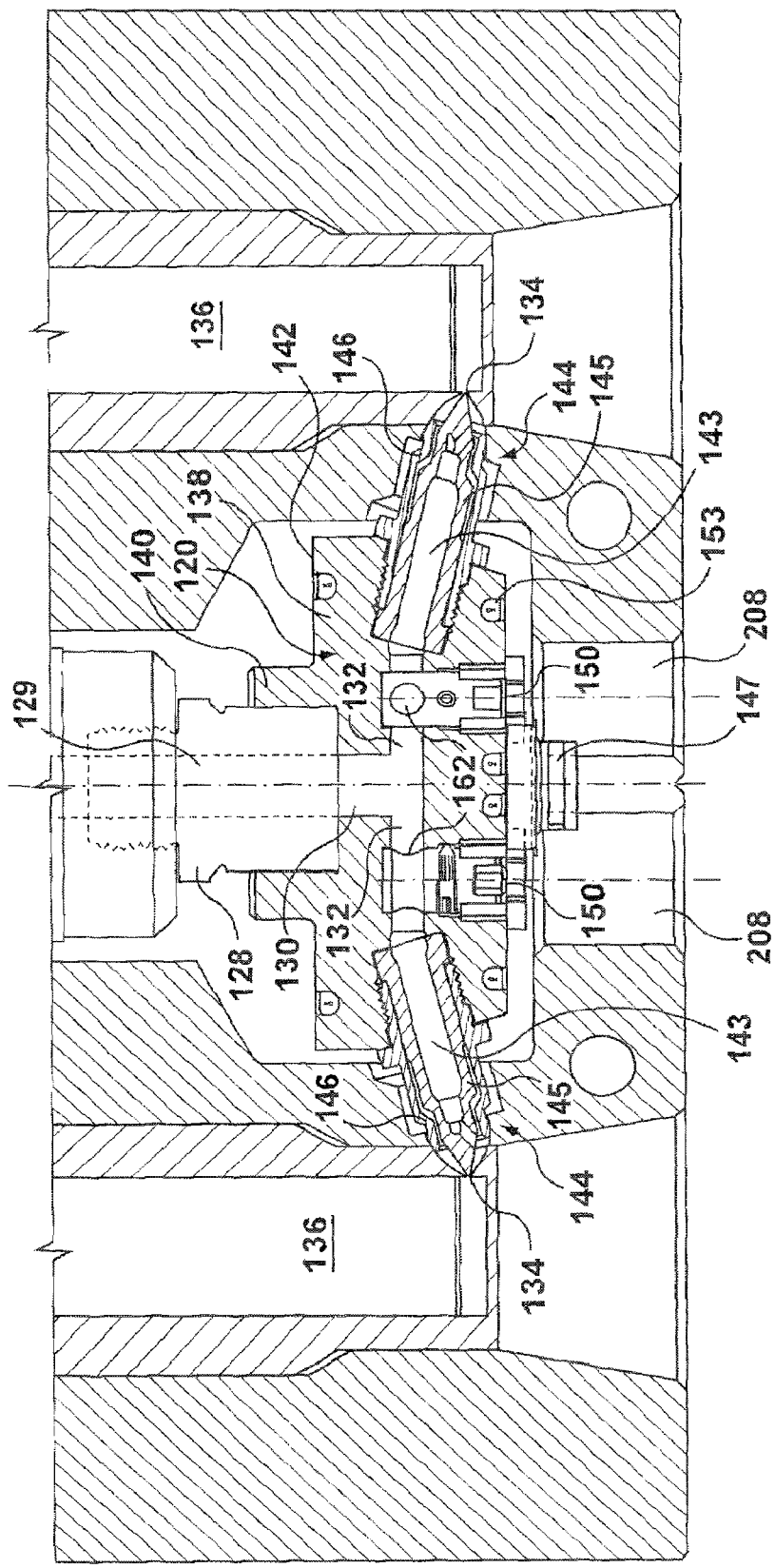
FIG. 2 is an enlarged view of a portion of FIG. 1.

A partial sectional view of an edge-gated injection molding apparatus in accordance with the present invention is illustrated in FIG. 1 and is generally indicated by reference numeral 100. FIG. 2 shows an enlarged view of a portion of the injection molding apparatus of FIG. 1. Injection molding apparatus 100 includes a manifold 102 that is located between a mold plate 104, a sprue bushing 106 and a back plate 108. A disk 110 restricts movement of the manifold 102 relative to the mold plate 104 and back plate 108 to axially fix the position of manifold 102. As such during operation, the manifold is effectively prevented from flexing in a direction of the back plate due to thermal expansion. An air space 112 is provided between the manifold 102 and the back plate 108. A machine nozzle (not shown) delivers a melt stream of molten material under pressure to a manifold channel 114 of the manifold 102 through sprue bushing 106. The disk 110 also helps to focus the force from manifold 102 directly over a first nozzle 116 to aid in sealing manifold 102 to first nozzle 116. Disk 110 maintains insulating air gap 112 between manifold 102 and back plate 108. Generally this disk is designed to provide minimum contact between manifold 102 and back plate 108 and is capable of flexing to absorb some of the forces therebetween.

A plurality of first, rear-mounted nozzles 116 are coupled to the manifold 102 (only one is shown in FIG. 1 for simplicity). Each first nozzle 116 includes a first nozzle melt channel 118 that is aligned with a respective manifold outlet 117 to receive the melt stream from the manifold channel 114. Each first nozzle 116 has a flange portion 119 that sits in a corresponding shoulder portion 121 of mold plate 104. The flange 119 being held in the corresponding shoulder 121 of the mold plate 104 acts to limit axial movement of the rear-mounted first nozzle 116 in the direction of a second nozzle 120, described below. During operation, the nozzle flange and mold plate shoulder arrangement supports the load from manifold 102 while still allowing the load from manifold 102 to be used as a sealing means/force between first nozzle 116 and manifold 102.

A nozzle body portion 122 of first nozzle 116 extends through an opening 124, which extends through mold plate 104 and a cavity plate 126. Nozzle heaters (not shown) are coupled about nozzle body 122 of each first nozzle 116 to provide heat thereto. The nozzle heaters are in communication with a power source (not shown) through an electrical connector (not shown). A thermocouple (not shown) is coupled to first nozzle 116 to provide temperature measurements thereof.

Second nozzle 120 is shown coupled to first nozzle 116 by a nozzle link 128. Second nozzle 120 is an edge-gating nozzle that includes a second nozzle melt channel 130, which is aligned with the first nozzle melt channel 118 of first nozzle 116 for receiving melt therefrom. Radially extending melt passages 132 branch out from second nozzle melt channel 130 to deliver melt through mold gates 134 to a series of mold cavities 136. Mold cavities 136 are radially spaced around nozzle tips/gate seals 144 coupled to second nozzle 120. Second nozzle 120 has a substantially brick-shaped nozzle body 138 as shown in FIGS. 10, 11, and 14 of U.S. Published Patent Application Publication No. 2005-0196486 A1. However, nozzle body 138 of second nozzle 120 can also be the substantially puck-shaped design shown in FIGS. 7-9 of U.S. Published Patent Application Publication No. 2005-0196486 A1 and described below with respect to FIGS. 7 and 8. A circular flange portion 140 extends from a back surface 142 of nozzle body 138 and is coupled to nozzle link 128. A projection 147 extends from a front surface 148 of nozzle body 138 to locate second nozzle 120 relative to mold cavity plate 126 to align gate seals 144 with mold gates 134, and to reduce lateral and longitudinal movement of second nozzle 120. As illustrated in FIG. 2, each second nozzle 120 includes a heater 153 and a respective thermocouple (not shown) for heating the melt therein. The nozzle heater 153 is in communication with a power source (not shown) through and electrical connectors (not shown). In the present embodiment as shown in FIGS. 1 and 2, heater 153 wraps around front surface 148 to back surface 142 of second nozzle 120 to beneficially surround gate seals 144 with heat.

Gate seals 144 threadably engage second nozzle 120 and include melt passages 143 to deliver melt from melt passages 132 to mold cavities 136 via mold gates 134. Each gate seal 144 is longitudinally fixed in position relative to each respective mold gate 134 and mold cavity 136. Gate seals 144 shown in FIGS. 1 and 2 are of a two part construction including a tip 145 that is surrounded by a seal 146. The gate seal 144 may be bimetallic, for example, the seal 146 may be comprised of H13 steel and the tip 145 may be comprised of carbide or beryllium copper. The seal 146 and tip 145 are not limited to being metallic and therefore, the gate seal 144 may be comprised of any suitable material combination. The seal 146 and the tip 145 may alternatively be comprised of the same material. Alternatively, gate seal 144 can be a one-piece arrangement as shown and described with respect to the embodiment of FIG. 5 of U.S Published Patent Application Publication No. 2005-0196486 A1.

Further details regarding first nozzle 116, second nozzle 120, and nozzle link 128 are provided in U.S Published Patent Application Publication No. 2005-0196486 A1. As noted therein, in operation, edge-gated injection molding apparatus 100 is heated to an operating temperature, which causes the components including the manifold 102 and first and second nozzles 116, 120 to expand. Manifold 102 is relatively fixed in position on one surface by the interaction between disk 110 and back plate 108 and on the other surface by first nozzle 116, more particularly by the interaction between flange 119 of first nozzle 116 and shoulder 121 of mold plate 104. Gate seals 144 of an edge-gated tip portion of second nozzle 120 are also relatively fixed in position with respect to mold gates 134. As such, the thermal expansion of the system is accommodated by the interaction of nozzle link 128 with first and second nozzles 116, 120.

A melt stream of molten material is delivered under pressure from a machine nozzle (not shown) to manifold channel 114 of manifold 102. The melt is distributed from manifold channel 114 to nozzle melt channels 118 of a plurality of first nozzles 116. The melt flows from the nozzle melt channels 118, through melt passages 129 of nozzle links 128 and into the second nozzle melt channels 130. The melt then flows through melt passages 132, through gate seals 144, past gates 134 and into a respective mold cavity 136. Once the injection portion of the cycle is complete, the molded parts are cooled and ejected from the mold cavities.

If a mold cavity, gate seal, or other portion of the injection molding apparatus related to a particular mold cavity becomes damaged or otherwise nonoperational, flow to that cavity can be shut off by a shut-off valve 150 of the present invention. Shut-off valves 150 are disposed within a bore 152 in second nozzle 120 and intersect with melt passages 132.

Figure 3:
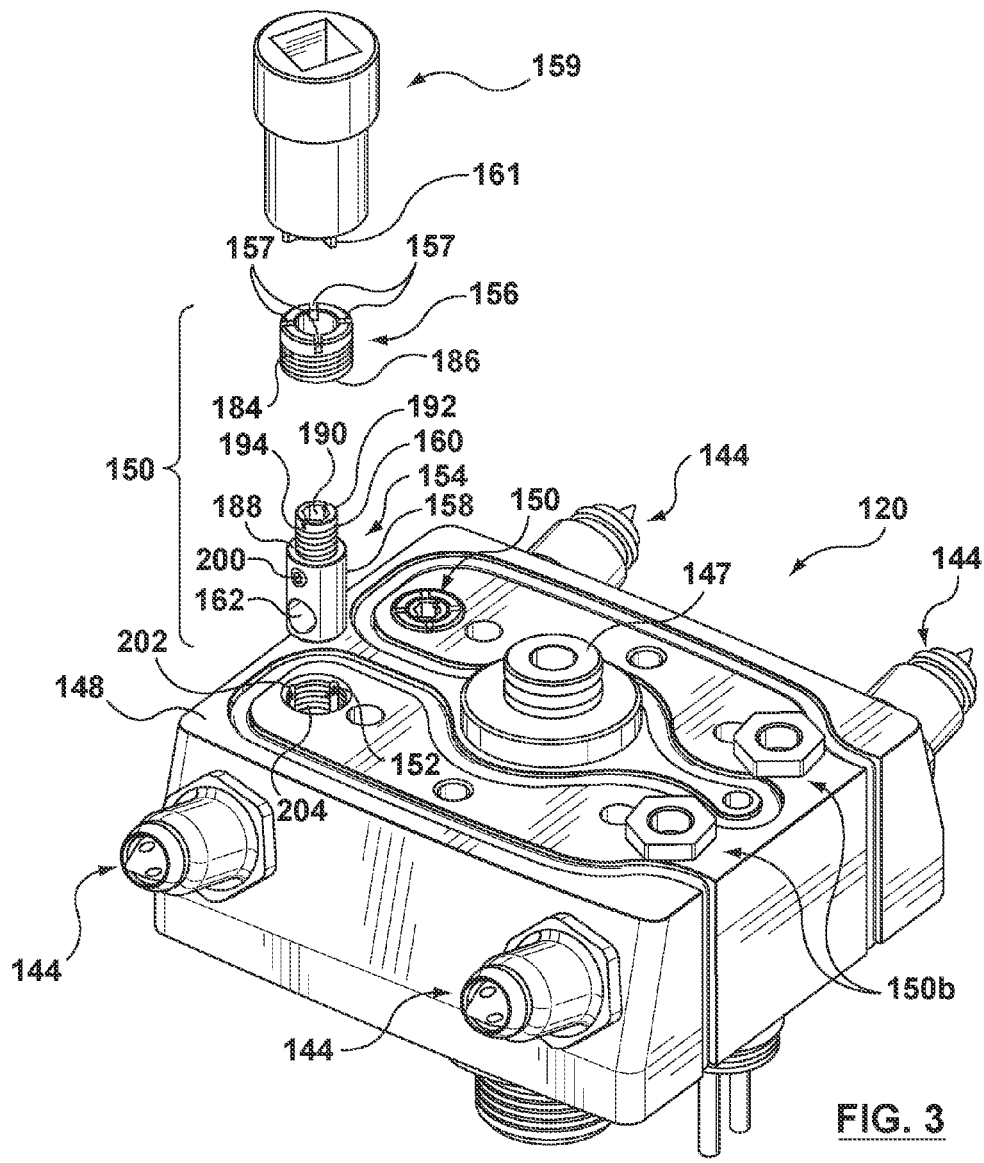
FIG. 3 is a bottom perspective view of the second nozzle of FIG. 1.

Shut-off valves 150 will be described in detail as shown in FIGS. 2-6. FIG. 3 is a persepective from a front (i.e., facing away from manifold 102) surface 148 of second nozzle 120. As can be seen, second nozzle 120 in FIG. 3 feeds four (4) cavities 136 through gate seals 144. Associated with each melt passage 132 leading to a gate seal 144 is a shut-off valve 150. In one embodiment, shut-off valve 150 includes a plug 154 and a cap 156. Plug 154 includes a first portion 158 and a second portion 160. First portion 158 has a larger diameter than second portion 160. First portion 158 fits snugly within bore 152. First portion 158 of plug 154 includes a passage 162 generally perpendicular to the longitudinal axis of plug 154 and extending through first portion 158. As shown in FIG. 2, passage 162 aligns with melt passage 132 to allow melt to flow therethrough and into cavity 136 through mold gate 134, as shown in left shut-off valve 150 of FIG. 2. By turning plug 154 so that passage 162 is perpendicular to melt passage 132, as shown in right shut-off valve 150 of FIG. 2, melt cannot pass through shut-off valve 150 and therefore does not flow into cavity 136. Such an arrangement permits an operator to shut-off flow to certain cavities without disrupting an entire system.

FIG. 3 shows two ways to retain plug 154 within second nozzle 120 for convenience of illustration. In practice, generally a single means to retain plugs 154 would be used. Shut-off valves 150 shown on the left side of FIG. 3 use a cap 156 that includes slots 157 in a front surface thereof. Cap 156 is a hollow cylinder and is threaded on an outside surface 184 thereof. Threaded outside surface 184 of cap 156 engages with threaded bore 152 in front surface 148 of second nozzle 120. A tool 159 including projections 161 engages cap 156 to tighten or loosen cap 156 within threaded bore 152. When tightening cap 156, a back surface 186 of cap 156 abuts a shoulder 188 of plug 154 to retain plug 154 within bore 152. In order to switch shut-off valve 150 from an open position to a closed position, or vice versa, tool 159 is used to loosen cap 156. Then a tool such as an allen wrench is inserted into a shaped recess 190 in front surface 192 of plug 154 to turn plug 154 such that passage 162 is moved from a position where passage 162 is substantially aligned with melt passage 32 (an open position) to a position wherein passage 162 is aligned substantially perpendicular to melt passage 32 (a closed position). Cap 156 is then tightened to secure plug 154 in bore 152. Cap 156, when tightened, is flush with front surface 148 of second nozzle 120, thereby not requiring any additional space.

Second portion 160 of plug 154 further includes a threaded outer surface 194. Threaded outer surface 194 is used to be engaged by a threaded inner surface of a tool (not shown) to achieve a secure hold on plug 154 in order to remove plug 154 from bore 152 of second nozzle 120, for example, if plug 154 is damaged, clogged, worn, or for any other reason. Alternatively, outer surface of plug 154 may have shaped recesses to be engaged by a tool for removal from second nozzle 120.

Shut-off valve 150 may further include a position-indicating button 200 located on an outside surface of first portion 158 of plug 154. Button 200 is spring assisted such that is biased outward. Bore 152 in second nozzle 120 includes vertical grooves 202 located 90 degrees apart from each other. Two grooves 202 are shown in FIG. 3, however, four grooves 202 may be used. When plug 154 is being rotated within bore 152, button 200 is pressed against inner wall 204 of bore 152. When plug 154 reaches a position such that button 200 is aligned within one of the grooves 202, the spring bias of button 200 causes it to click forward into groove 202, thereby indicating that plug 154 is in the open or closed position. The spring bias of button 200 is light such that it can be easily overcome to move button 200 out of groove 202 to move pluig from an open to a closed position, or vice versa. Witness/graduation marks, etc could also be used to locate the position of the plug.

Figure 3A:
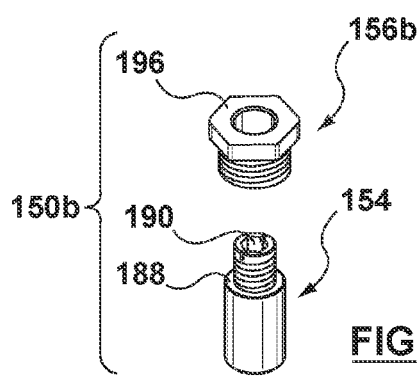
FIG. 3A is a perspective view of an alternative shut-off valve.

FIG. 3A shows an alternative embodiment of shut-off valve 150b. Shut-off valve 150b includes a plug 154 that is identical to plug 154 of shut-off valve 150. Shut-off valve further includes a cap 156b. Cap 156b is similar to cap 156 of shut-off valve 150, however, it does not require a special tool to remove it. Instead, cap 156b includes a nut-shaped head 196 that can be engaged with a conventional socket. Cap 156b is a hollow cylinder such that when it is tightened within threaded bore 152 such that shoulder 188 of plug 154 rests against it, recess 190 of plug 154 can be accessed. In all other aspects, shut-off valve 150b is identical to shut-off valve 150.

Figure 4:
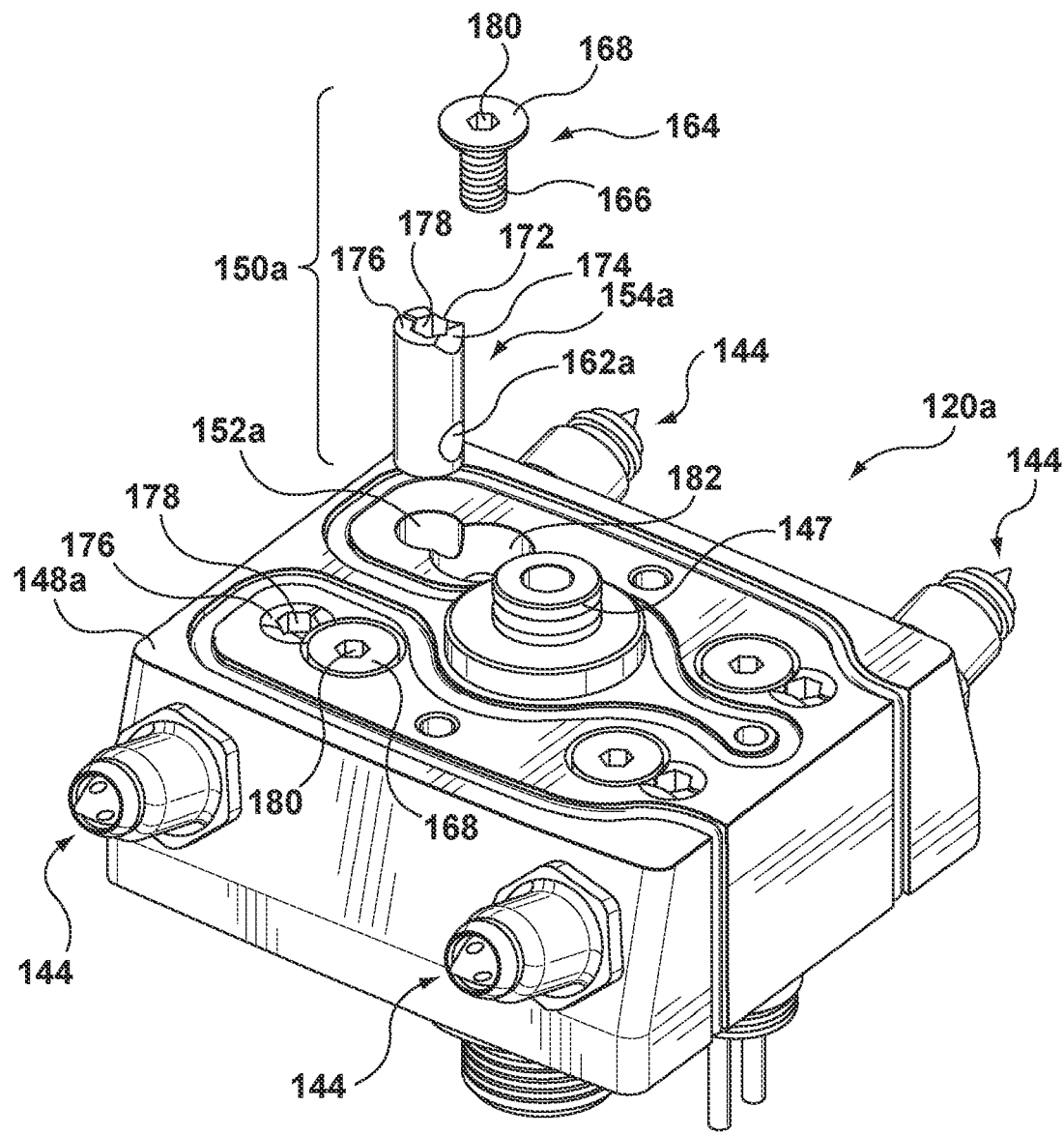
FIG. 4 is a bottom perspective view of a second nozzle showing an alternative shut-off valve.

FIG. 4 shows another embodiment of a shut-off valve 150a similar to FIG. 3. FIG. 4 is a perspective view showing the front surface 148a of a second nozzle 120a. Second nozzle 120a is similar to second nozzle 120 of FIG. 3 in all respects except with respect to shut-off valve 150a. Shut-off valve 150a of FIG. 4 includes a plug 154a and a cap 164. Plug 154a includes a passage 162a therethrough which is generally perpendicular to the longitudinal axis of plug 154a. Plug 154a further includes two crescent shaped cut-outs 172, 174 adajacent a front surface 176 of plug 154a. Plug 154a is disposed in bore 152a in front surface of 148a of second nozzle 120a. Cap 164 includes a threaded portion 166 and a head 168 which is larger than threaded portion 166. Cap 164 is disposed in a threaded bore 182 in front surface 148a of second nozzle 120a. Bore 182 is adjacent bore 154a. Head 168 of cap 164 overlaps plug 154a at cut-out 172 or 174 to retain plug 154a in nozzle 120a. When plug 154a is arranged such that head 168 of cap 164 overlaps cut-out 174, passage 162a is aligned substantially perpendicular to melt passage 132 such that plug 154a is in the closed position, as shown in right portion of FIG. 2. When plug 154a is arranged such that head 168 of cap 164 overlaps cut-out 172, passage 162a is substantially aligned with melt passage 132 such that plug 154a is in the open position, as shown in the left portion of FIG. 2. In order to adjust the position of plug 154a from open to closed or vice versa, a tool such as an allen wrench is inserted into a shaped recess 180 in head 168 of cap 164. Cap 164 is rotated such that it is loosened from threaded bore 182, thereby freeing plug 154a. A tool such as an allen wrench is then inserted into a shaped recess 178 in front surface 176 of plug 154a and plug 154a is rotated such that one of cut-out 172 or 174 is facing bore 182, depending on whether the desired position of plug 154a is open or closed. Only one shut-off valve 150a of FIG. 4 has been described, but as can be seen in FIG. 4, a plug 154a of a shut-off valve 150a intersects each melt passage 132 directed towards a respective gate seal 144.

Plugs 154, 154a and caps 156, 156a, and 156b, may be made of any suitable material such as beryllium copper, copper, copper alloys, or tool steel (H13).

Figure 5:
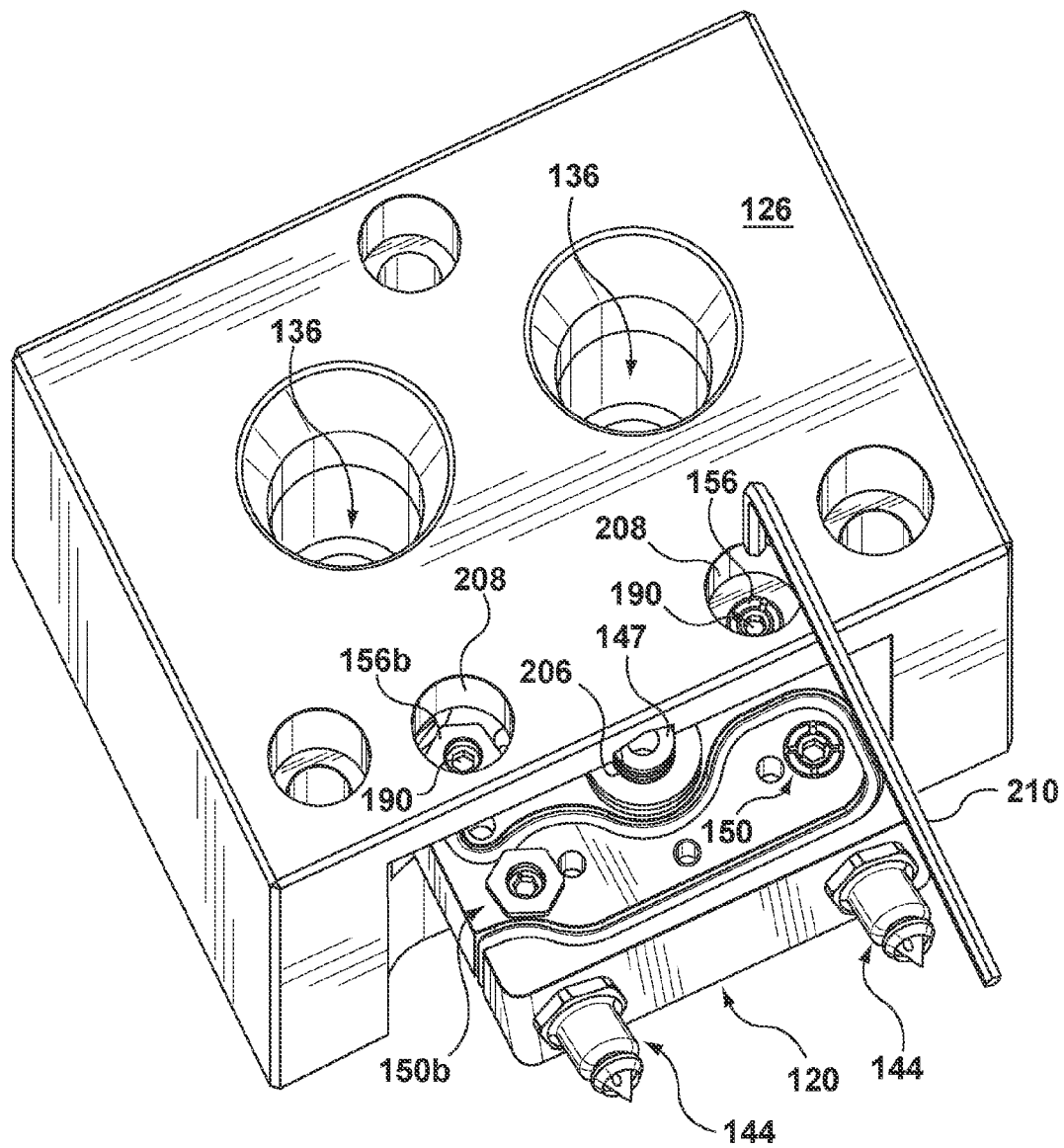
FIG. 5 is a bottom perspective view of the second nozzle 120 of FIG. 3 and a portion of the mold cavity plate.
Figure 6:
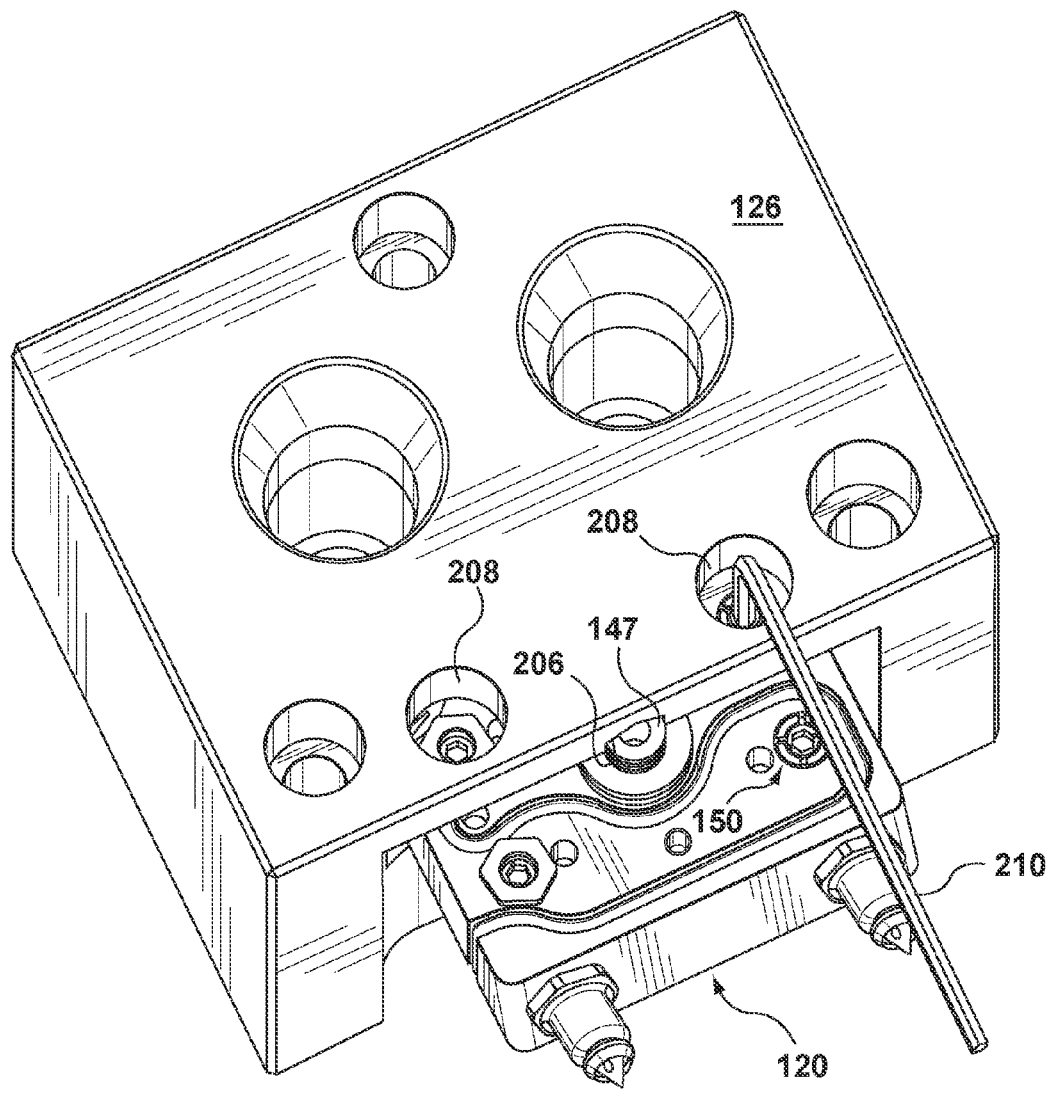
FIG. 6 is a bottom perspective view of the second nozzle of FIG. 3 and a portion of the mold cavity plate.

FIGS. 5 and 6 show second nozzle 120 with a partial cut-away of mold cavity plate 126 surrounding second nozzle 120. Mold cavity plate 126 includes a recess 206 for receiving projection 147 of second nozzle 120. Mold cavity plate 126 further includes bores 208 for access to shut-off valves 150. In order to switch a shut-off valve 150 from an open position to a closed position, tool 159 or a socket (not shown), depending on whether a cap 156 or 156b is used, is inserted through bore 208, engages cap 156 or 156b, and is turned to loosen cap 156 or 156b. A tool such as an allen wrench 210 is then inserted through bore 208 and engages shaped recess 190 in plug 154, as shown in FIG. 6, to turn plug 154 to the desired position, as described above. If shut-off valve 150a shown in FIG. 4 is used, bores 208 may need to be larger in order to provide access to both cap 164 and plug 154a, as would be understood by one of ordinary skill in the art.

Figure 7:
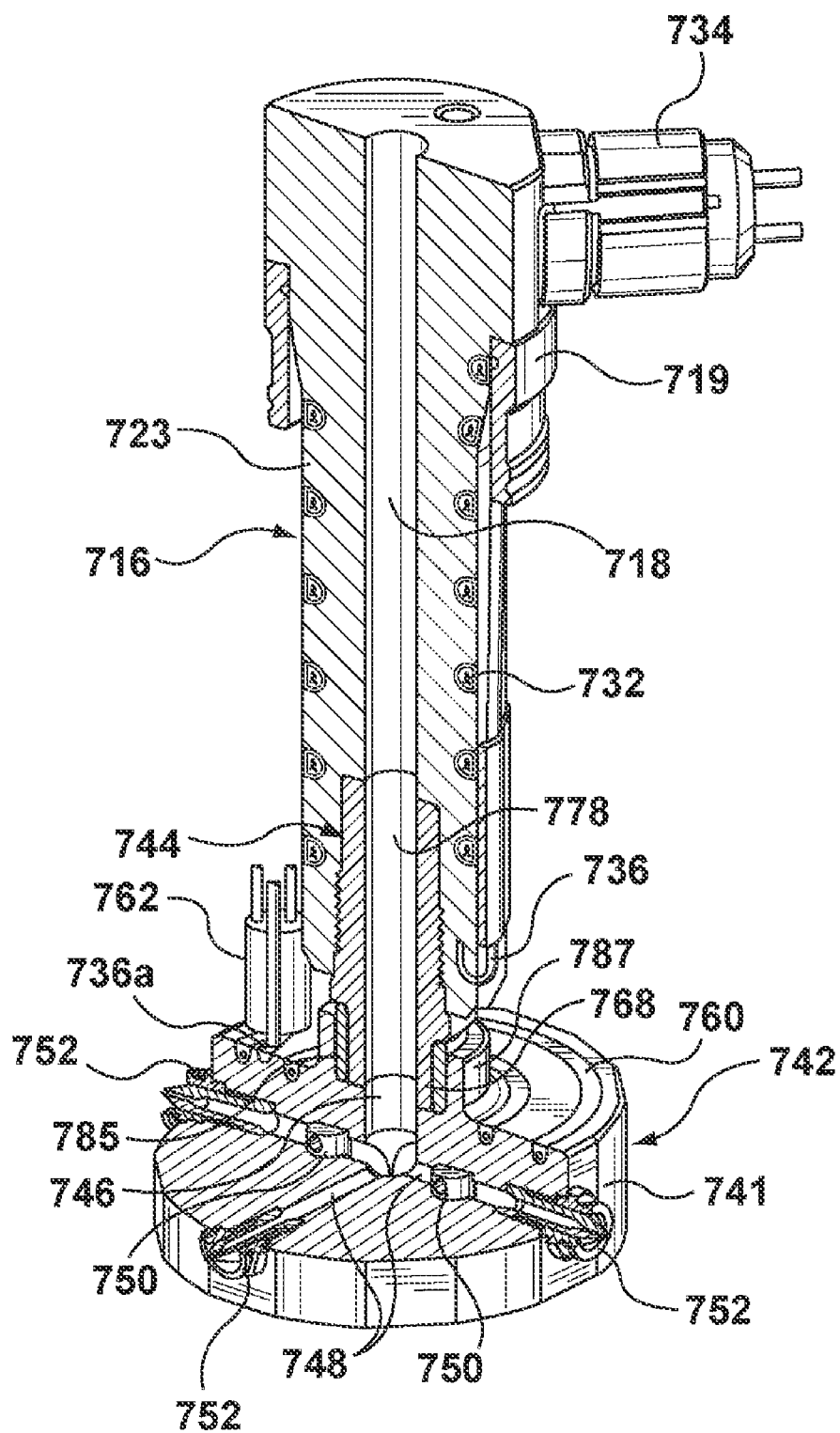
FIG. 7 is a partial cross-sectional view of a portion of an injection molding apparatus according to an embodiment of the present invention.
Figure 8:
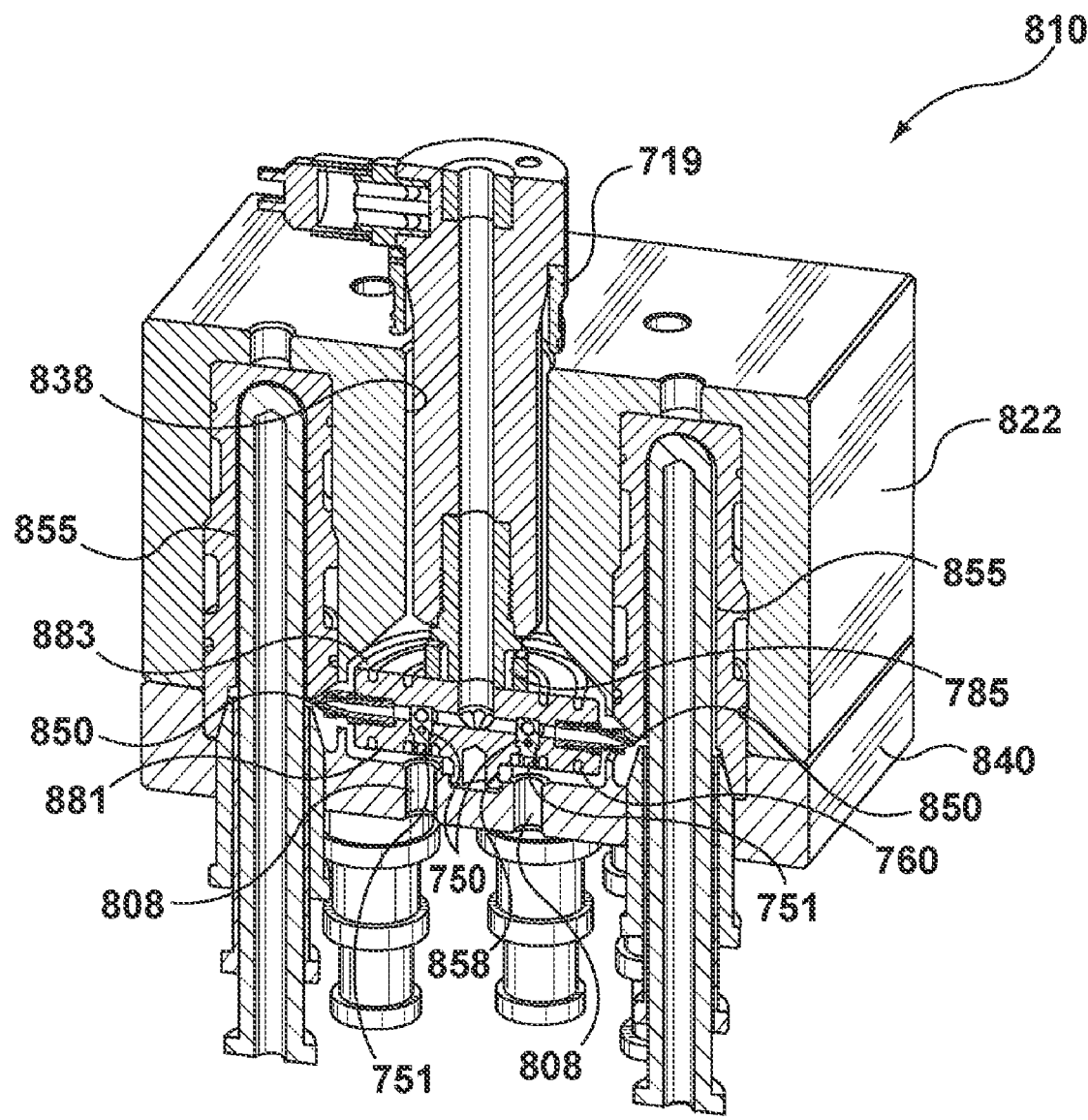
FIG. 8 is a partial cross-sectional view of the embodiment of FIG. 7 in a portion of an edge-gated system.

An edge-gated injection molding apparatus in accordance with another embodiment of the present invention is illustrated in FIGS. 7-9 and is generally indicated by reference numeral 810. Injection molding apparatus 810 includes a manifold (not shown) and is relatively fixed in position as described above with reference to the embodiment of FIGS. 1-3.

In this embodiment, a plurality of first, rear-mounted nozzles 716 are fluidly coupled to the manifold, each of which includes a first nozzle melt channel 718 fluidly coupled to a respective manifold channel (not shown). First nozzle 716 includes a body portion 723 that extends through an opening 838 of a mold plate 822. Each first nozzle 716 also includes a flange portion 719 that sits against mold plate 822. Flange portion 719 may be removable or an integral portion of first nozzle 716. When installed in an injection molding apparatus, the flange is held against the mold plate and acts to limit axial movement of the rear-mounted nozzle in the direction of a front-mounted nozzle 742 described below. During operation, the nozzle flange and mold plate arrangement acts in the same manner as described above with reference to the embodiment of FIGS. 1-3.

The embodiment of the present invention illustrated in FIGS. 7-9 includes second, front-mounted nozzle 742 fluidly coupled to first nozzle 716 by a nozzle link 744, which is described in greater detail below. Second nozzle 742 is an edge-gating nozzle that includes a second nozzle melt channel 746 for receiving melt from first nozzle melt channel 718. Radially extending melt passages 748 branch out from second nozzle melt channel 746 to deliver melt through gates 850 to a series of mold cavities 855. Mold cavities are radially spaced around an edge-gated tip portion of second nozzle 742. Second nozzle 742 has a substantially puck-shaped nozzle body 741 with a circular flange portion 787 extending from a back surface 883 and a projection 858 extending from a front surface 881. Projection 858 locates second nozzle 742 relative to a mold cavity plate 840 to align gates seals 752 with mold gates 850, and to reduce lateral and longitudinal movement of second nozzle 742.

Gate seals 752 threadably engage second nozzle 742 to deliver melt from melt passages 748 to mold cavities 855 via mold gates 850. Each gate seal 752 is longitudinally fixed in position relative to each respective mold gate 850 and mold cavity 855 as shown in FIG. 8. Gate seals 752 can be a two-piece seal, as shown and described above with respect to the embodiment of FIGS. 1 and 2. In the alternative, gate seal 752 can be a one-piece arrangement.

As illustrated in FIG. 7, each of first nozzle 716 and second nozzle 742 includes a heater 732, 760 and respective thermocouples 736, 736a for heating the melt therein. The nozzle heaters 732, 760 are in communication with a power source (not shown) through respective electrical connectors 734, 762. In the present embodiment as shown in FIG. 8, heater 760 wraps around a front surface 881 to back surface 883 of second nozzle 742 to beneficially surround gate seals 752 with heat.

In the embodiment of FIGS. 7 and 8, nozzle link 744 is coupled to first nozzle 716 and second nozzle 742 in a similar manner as described above with a seal 785 between a forward end 768 of nozzle link 744 and flange 787 of second nozzle 742. Seal 785 prevents melt leakage and absorbs the forces of thermal expansion of nozzle link 744. In one embodiment, seal 785 may be made of an insulative material to prevent heat loss at the slidable connection between the nozzle link and second nozzle. Although not shown, nozzle link 744 may seat within flange 787 of second nozzle 742 such that a gap is present between a forward end of the nozzle link and back surface 883 of second nozzle 742 during cold conditions.

Nozzle link 744 includes a melt passage 778 of a constant diameter, which allows melt to flow from first nozzle melt channel 718 to second nozzle melt channel 746 without an undesirable drop in pressure therebetween.

Second nozzle 742 includes shut-off valves 750 disposed within bores 751 in second nozzle 742. Shut-off valves 750 intersect with melt passages 748. Shut-off-valves 750 may be any of the shut-off valves described with respect to FIGS. 2-6 disposed in a puck-shaped second nozzle 742.

In each embodiment of the present invention described above, a convenient way to shut off an individual cavity in an injection molding apparatus is provided. Access to the shut-off valve is provided from the front of the apparatus, thus parts of the apparatus do not need to be removed to shut off an individual cavity. Further, even if the shut-off valve is damaged or needs to be replaced as part of regularly scheduled maintenance, it is easily accessed from the front of the apparatus without without disturbing the remainder of the injection molding apparatus.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a manifold having at least one manifold melt channel for receiving a melt stream of moldable material under pressure;
   a first nozzle having a first nozzle melt channel in fluid communication with said manifold melt channel;
   a second nozzle having a second nozzle body, a second nozzle melt channel in fluid communication with said first nozzle melt channel and a plurality of outwardly extending melt passages in fluid communication with said second nozzle melt channel;
   a nozzle link provided between the first nozzle and the second nozzle and having a nozzle link melt passage for fluidly coupling the first nozzle melt channel and the second nozzle melt channel,
   a plurality of gate seals coupled to said second nozzle, said plurality of gate seals for delivering the melt stream from said plurality of outwardly extending melt passages to a plurality of mold cavities through respective mold gates;
   a shut-off valve disposed within a bore in said second nozzle body, wherein said bore intersects with one of said outwardly extending melt passages, wherein said shut-off valve includes a passage therethrough such that when said passage is aligned with said outwardly extending melt passage, the melt stream may flow through said shut-off valve, and when said passage is aligned substantially perpendicular to said outwardly extending melt passage, the melt stream is prevented from flowing past said shut off-valve.

2. The injection molding apparatus of claim 1, wherein the length of said second nozzle body is less than at least one of said width and said depth of said second nozzle body.

3. The injection molding apparatus of claim 2, wherein said second nozzle body is substantially puck-shaped.

4. The injection molding apparatus of claim 2, wherein said second nozzle body is substantially brick-shaped.

5. The injection molding apparatus of claim 1, wherein said shut-off valve comprises a plug and a cap, said plug having a longitudinal axis and including a first portion and a second portion, wherein the first portion has a larger diameter than the second portion.

6. The injection molding apparatus of claim 5, wherein the first portion fits snugly within the bore in said second nozzle body.

7. The injection molding apparatus of claim 6, wherein the passage is provided through the first portion and is generally perpendicular to the longitudinal axis of the plug.

8. The injection molding apparatus of claim 5, wherein the cap is a hollow cylinder including threads on an outside surface, wherein the threaded outside surface of the cap engages threads on an inside surface of the bore in said second nozzle body, and wherein the second portion of the plug is disposed within the cap.

9. The injection molding apparatus of claim 8, wherein the cap includes slots in a front surface thereof and a tool engages the cap to tighten or loosen the cap within the bore, wherein when the cap is loosened the plug may be rotated so as to align the passage in the plug with the radially-extending passage or perpendicular to the radially-extending passage.

10. The injection molding apparatus of claim 9, wherein the second portion of the plug includes a threaded outer surface.

11. The injection molding apparatus of claim 9, wherein the second portions of the plug includes a shaped recess adapted to be engaged by a tool.

12. The injection molding apparatus of claim 5, wherein the shut-off valve further comprises a position-indicating button located on an outside surface of the first portion of the plug.

13. The injection molding apparatus of claim 5, wherein the cap includes a nut-shaped head adapted to be engaged with a conventional socket, and wherein the cap includes a threaded outer surface adapted to be engaged with a threaded inner surface of the bore.

14. The injection molding apparatus of claim 1, wherein the shut-off valve further comprises:
   a plug having a passage that is generally perpendicular to a longitudinal axis of the plug, wherein the plug includes at least two recesses in a front surface of the plug; and
   a cap including a threaded portion and a head which is larger than the threaded portion,
   wherein the cap is disposed in a second bore in a front surface of the second nozzle body adjacent the bore, and wherein the head of the cap overlaps the plug at one of the recesses to the retain plug in the bore.

15. The injection molding apparatus of claim 14, wherein when the plug is arranged such that the cap overlaps one of the recesses and the passage in the plug is substantially aligned with the outwardly extending melt passage, and when the cap overlaps with the other of the recesses the passage in the plug is substantially perpendicular to the outwardly extending melt passage.

16. The injection molding apparatus of claim 1, wherein the first nozzle or the second nozzle includes a heater.

17. An injection molding apparatus comprising:
   a manifold having at least one manifold melt channel for receiving a melt stream of moldable material under pressure;
   a nozzle having a heater, a nozzle melt channel in fluid communication with said manifold melt channel, and a plurality of outwardly extending melt passages in fluid communication with said nozzle melt channel;
   a plurality of gate seals coupled to said nozzle, said plurality of gate seals for delivering the melt stream from said plurality of outwardly extending melt passages to a plurality of mold cavities through respective mold gates;
   a plurality of shut-off valves, each shut-off valve disposed within said nozzle and associated with an outwardly extending melt passage, each shut-off valve independently switchable between an open position and a closed position.

18. The injection molding apparatus of claim 17, wherein each shut-off valve comprises a rotatable plug having a passage, each plug being disposed within a bore of said nozzle.

19. The injection molding apparatus of claim 18, wherein the passage is perpendicular to the longitudinal axis of the plug.

20. The injection molding apparatus of claim 18, wherein each shut-off valve further comprises a cap, wherein each cap secures each plug.

21. The injection molding apparatus of claim 20, wherein each cap is threaded to the nozzle.

22. The injection molding apparatus of claim 17, wherein each shut-off valve comprises a position indicator.

23. The injection molding apparatus of claim 17, wherein said nozzle comprises:
   a first nozzle having a first nozzle melt channel in fluid communication with said manifold melt channel;
   a second nozzle having a second nozzle body, a second nozzle melt channel in fluid communication with said first nozzle melt channel to define the nozzle melt channel; and
   a nozzle link provided between the first nozzle and the second nozzle and having a nozzle link melt passage for fluidly coupling the first nozzle melt channel and the second nozzle melt channel.

24. The injection molding apparatus of claim 17, wherein each shut-off valve is disposed within a bore in said nozzle, wherein said bore intersects with one of said outwardly extending melt passages, wherein said shut-off valve includes a passage therethrough such that when said passage is aligned with said outwardly extending melt passage, the melt stream flows through said shut-off valve, and when said passage is aligned substantially perpendicular to said outwardly extending melt passage, the melt stream is prevented from flowing past said shut-off valve.

* * * * *